UNITED STATES PATENT OFFICE 2,369,491

PREPARATION OF ALKALI METAL HYDRACRYLATES

Bryan C. Redmon and George R. Griffin, Stamford, Conn., assignors to American Cyanamid Company, New York, N. Y., a corporation of Maine No Drawing. Application October 7, 1942, Serial No. 461,231

4 Claims. (Cl. 260—535)

This invention relates to the production of alkali metal hydracrylates.

An object of this invention is to provide an improved process for the production of alkali metal hydracrylates.

This and other objects are attained by adding ethylene cyanohydrin to an aqueous solution of a strong base of an alkali metal, said solution being maintained at a temperature between about 70° C. and about 100° C. and advantageously in the neighborhood of 100° C. Preferably, the ethylene cyanohydrin and alkali metal hydroxide are employed in stoichiometric proportions although other proportions may be used if desirable.

The following example, in which the proportions are in parts by weight, is given by way of illustration and not in limitation:

Example

| | Parts |
|---|---|
| Ethylene cyanohydrin | 710 |
| Sodium hydroxide | 404 |
| Water | 1000 |

The ethylene cyanohydrin is added slowly, and either continuously or in small proportions, over a period of about 1 hour to a solution of the water and sodium hydroxide which is maintained at a temperature of about 95°–100° C. During the addition of the ethylene cyanohydrin, the reacting mixture is preferably agitated as, for example, by means of a suitable stirrer. A large proportion of the ammonia which is liberated during the addition of the ethylene cyanohydrin is given off and its removal may be facilitated by introducing a small stream of steam into the reacting mixture. After all of the ethylene cyanohydrin is added, the solution may be maintained at the reaction temperature for from a few minutes to an hour or more in order to insure the complete hydrolysis of any unreacted ethylene cyanohydrin. The residual ammonia may be volatilized from the solution and part of the water may be removed thereby providing a solution of sodium hydracrylate which may be used in preparing hydracrylic acid or for other purposes. Otherwise, the water may be evaporated leaving as a product sodium hydracrylate of about 95–100% purity. The sodium hydracrylate may be further purified by recrystallization, by solvent extraction or by any other suitable means. Another method of producing a pure alkali metal hydracrylate is to convert the sodium hydracrylate to the free hydracrylic acid by means of an acid such as sulfuric acid, separating the hydracrylic acid from the salt cake by solvent extraction, by centrifuging or in any other desired manner, and converting it to the desired alkali metal salt.

We have found that the hydrolysis of ethylene cyanohydrin proceeds rapidly and that we avoid the difficulties encountered in the prior art methods which employed low temperatures. If a low temperature be used, the reaction proceeds very slowly until a violent exothermic reaction begins at which time the reaction proceeds violently and cannot be controlled. This violent exothermic reaction gives poor yields and is not suitable for commercial operation because of the dangers involved in the exothermic reaction. For example, excessive foaming may occur, causing the reacting mixture to be thrown out of the equipment. By using a relatively high temperature, i. e., at or near 100° C. or at least about 70° C., we obtain a very rapid reaction of the ethylene cyanohydrin as it is added to the caustic bath. There is, therefore, very little unreacted ethylene cyanohydrin in the reacting mixture at any particular time and accordingly the reaction can be controlled by the rate at which the ethylene cyanohydrin is added to the caustic solution. Generally the ethylene cyanohydrin is added over a period of about one hour up to about four hours although the time is subject to some variation. If temperatures substantially below 70° C. be employed, the reaction proceeds so slowly that the concentration of unreacted ethylene cyanohydrin builds up to a dangerous point at which the exothermic heat of reaction of the large quantity of ethylene cyanohydrin may cause the undesirable effects mentioned above. Furthermore, if temperatures substantially below 70° C. be employed, low yields are obtained because of the side reactions which may also occur. Actually the reaction rate is much higher at a temperature of about 100° C. than at 70° C. and we prefer to carry out our process at or near 100° C. However, temperatures between 90° C. and 100° C. give excellent results.

Usually it is convenient to employ atmospheric pressure but the process may be carried out at reduced or elevated pressure if desired. If elevated pressures be used, reaction temperatures above 100° C. may be utilized.

Any alkali metal hydroxide may be employed for carrying out this process. For economic reasons, we prefer to use sodium hydroxide although potassium hydroxide may be employed with similar results. In place of the alkali metal hydroxide, we may also use any of the strong bases of the alkali metals, such as sodium carbonate and potassium carbonate, but it is more desirable to employ the hydroxide as the reaction proceeds somewhat more rapidly with the latter. Conveniently, the concentration of the base may be from about 10% to about 20% although this may be varied widely.

The alkali metal hydracrylates prepared in accordance with our invention have a wide field of uses. Among these, they are especially suited for the production of hydracrylic acid which in turn may be used in preparing acrylic acid or esters thereof.

The processes and compositions described herein may be varied in many ways without departing from the spirit and scope of the invention as defined in the appended claims.

We claim:

1. A process of preparing alkali metal hydracrylates which comprises adding ethylene cyanohydrin to an aqueous solution of a strong base of an alkali metal, said solution being maintained at a temperature of at least 70° C.

2. A process of preparing alkali metal hydracrylates which comprises adding ethylene cyanohydrin slowly to an aqueous solution of an alkali metal hydroxide, said solution being maintained at a temperature of about 70° C. to about 100° C.

3. A process as in claim 2 wherein the alkali metal hydroxide is sodium hydroxide.

4. A process of preparing sodium hydracrylate which comprises adding ethylene cyanohydrin slowly to an aqueous solution of sodium hydroxide, said solution being maintained at a temperature of about 100° C.

BRYAN C. REDMON.
GEORGE R. GRIFFIN.